United States Patent [19]

Lane, Jr. et al.

[11] Patent Number: 5,779,263
[45] Date of Patent: Jul. 14, 1998

[54] INTEGRATED SIDE IMPACT AIR BAG SYSTEM WITHIN A SEAT STRUCTURE

[75] Inventors: Wendell C. Lane, Jr., Romeo; Michael J. Lachat, Shelby; Michael A. Hague, Troy; Patrick J. Fonk, Sterling Heights, all of Mich.

[73] Assignee: AlliedSignal Inc., Morristown, N.J.

[21] Appl. No.: 787,497

[22] Filed: Jan. 21, 1997

[51] Int. Cl.⁶ .................................................. B60R 21/22
[52] U.S. Cl. .............................. 280/730.2; 280/730.1; 280/728.2
[58] Field of Search .................... 280/730.2, 730.1, 280/728.2, 728.1; 297/216.1, 216.13

[56] References Cited

U.S. PATENT DOCUMENTS 5,348,342  9/1994  Haland et al. .................... 280/730.2
5,482,315  1/1996  Chandler, Jr. et al. ............. 280/741
5,503,428  4/1996  Awotwi et al. .................... 280/730.2
5,556,127  9/1996  Hurford et al. .................... 280/730.2
5,630,616  5/1997  McPherson ........................ 280/730.2

FOREIGN PATENT DOCUMENTS 4209944  5/1993  Germany ........................... 280/730.1

*Primary Examiner*—Christopher P. Ellis
*Attorney, Agent, or Firm*—Markell Seitzman

[57] ABSTRACT

An assembly comprising: a seat (20) having a tubular frame part (40a) having a gas flow port (80); and an air bag module (36) comprising an inflator (50), the inflator including at least one exit port (56); wherein the inflator (50) is mounted within the frame part (40a) with the exit port (56) in fluid communication with the flow port (60). In one embodiment the inflator is slid into its desired position through the tubular frame part and in another the inflator (and a manifold 80') is received within an opening in the frame part.

8 Claims, 4 Drawing Sheets

INTEGRATED SIDE IMPACT AIR BAG SYSTEM WITHIN A SEAT STRUCTURE

BACKGROUND AND SUMMARY OF THE INVENTION

The present invention relates generally to side impact air bag systems and more particularly to a system integrated within the structure of a vehicle seat.

Accordingly the invention comprises: an assembly including: a seat having a tubular frame part having a gas flow port; and an air bag module comprising an inflator, the inflator including at least one exit port; wherein the inflator is mounted within the frame part with the exit port in fluid communication with the flow port. In one embodiment the inflator is slid into its desired position through the tubular frame part and in another the inflator (and a manifold) is received within an opening in the frame part.

Many other objects and purposes of the invention will be clear from the following detailed description of the drawings.

DETAILED DESCRIPTION OF THE DRAWINGS

Figure 1:
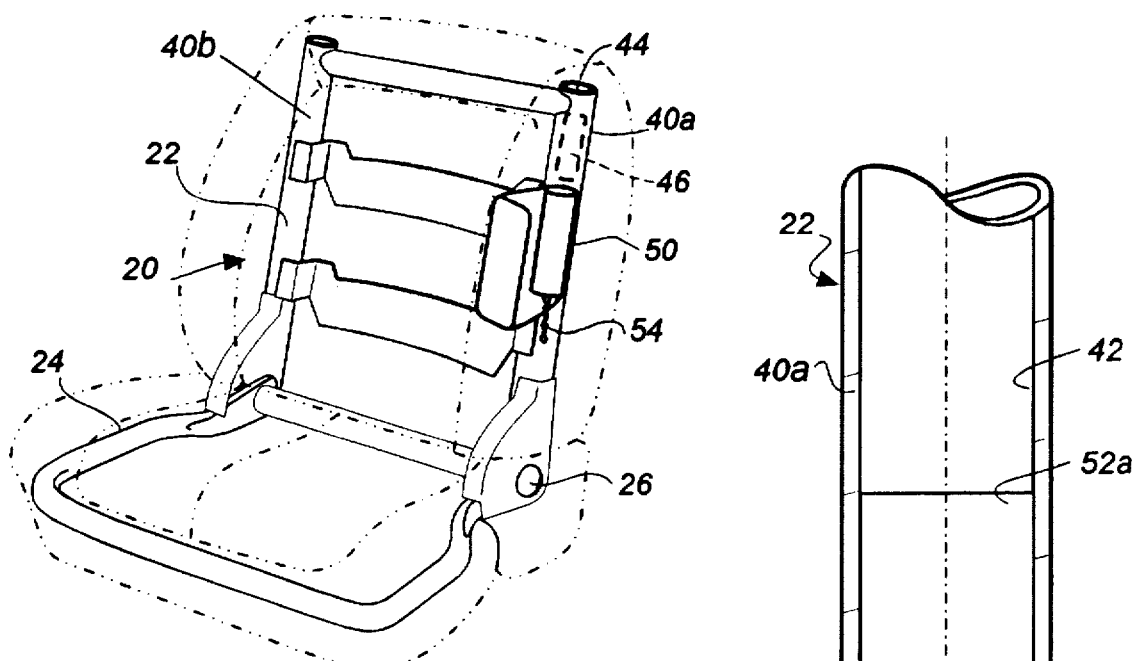
FIG. 1 is a orthogonal view of a vehicle seat incorporating an air bag module.

FIG. 1 illustrates a vehicle seat 20 having upper and lower support frame 22 and 24. The upper frame may be joined to the lower frame at a hinge 26 which is incidental to the invention. The lower frame 24 is covered by a layer of foam and an outer layer or skin, both generally shown as 32 forming the lower cushion of the seat 20. The upper frame 22 is similarly covered by foam and an outer layer or skin, both generally shown as 34 forming a seat back 34. The outer layers are typically cloth, plastic or leather. The foam of the seat back 34 is made or formed with a cavity or well 36 in which is placed a side impact module 38. The module includes a cushion/manifold pack 70 and an inflator 50.

Figure 2:
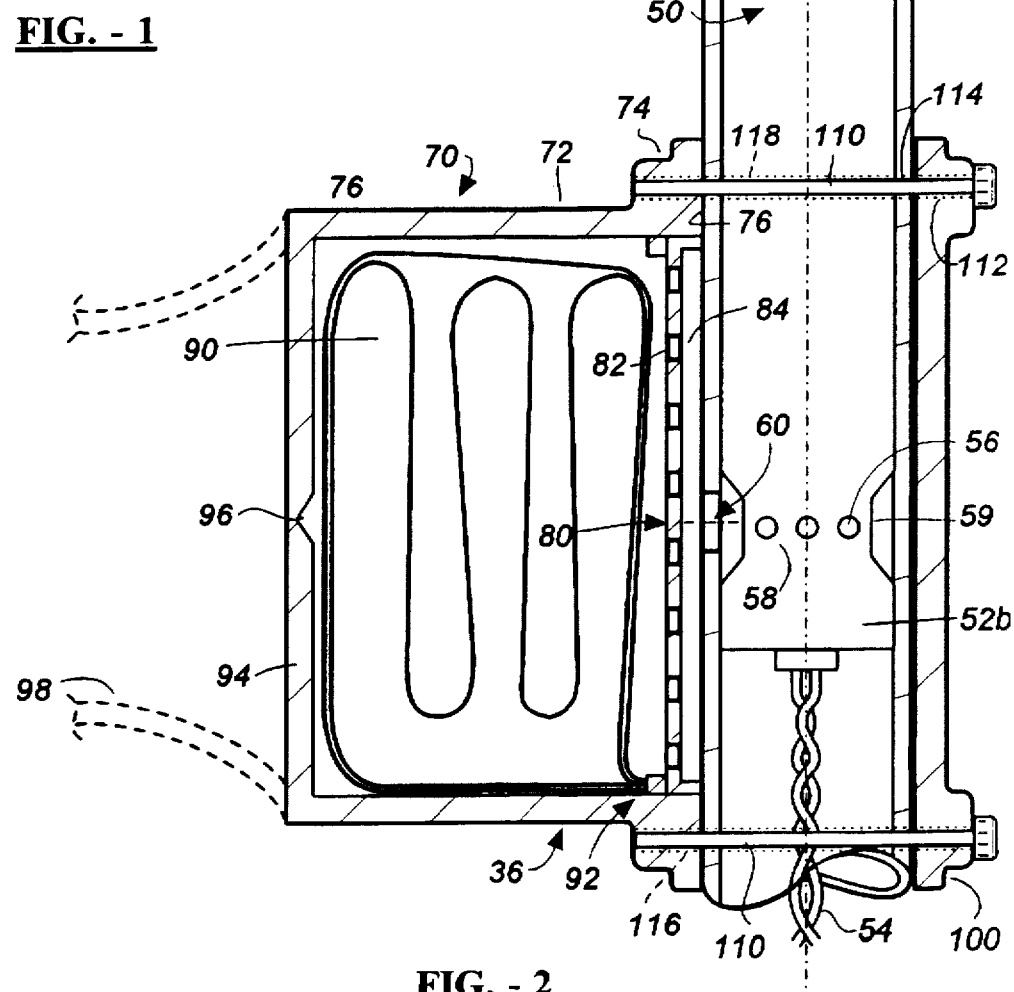
FIG. 2 is an enlarged view of a portion of FIG. 1.

The upper frame 24 includes a plurality of vertical support members or frame parts 40a,b. At least one such member 40a, which is located proximate the side of the vehicle, is tubular. Reference is made to FIG. 2 which shows a first embodiment of the invention in greater detail. In this embodiment a narrow, cylindrically shaped inflator 50 is inserted within and enveloped by the tubular frame part 40a. The inflator is sealed by interference to the interior wall 42 of the frame part 40a at its upper and lower ends 52a,b to prevent inflation gas flowing or escaping into an adjacent portion of the tubular frame part 40a. This sealing can be accomplished in any known manner such as using an interference fit between the inflator 50 and the interior wall 42 or by using O-rings installed within grooves in the upper and lower ends 52a,b of the inflator (not shown). The inflator may be a hybrid inflator in which case it includes a pressure vessel (not shown) in which is stored a volume of inert gas and a quantity of propellant which heats the stored gas prior to receipt by an air bag. Various hybrid inflators are available for installation in the seat. An electrical signal is communicated from a control unit in response to a crash signal generated by a side impact crash sensor (typically installed within the vehicle door adjacent the seat). The electrical signal is received through wires 54 and ignites a squib or initiator (not shown) which causes the propellant to burn in a known manner. The illustrated inflator includes a plurality of gas exit ports 56 within a narrowed or necked-down portion 58 of the inflator defining a distribution chamber 59. The inflator may be any other type such as a liquid or solid propellant inflator. In the illustrated embodiment, the inflator 50 is installed such that its exit ports 56 and necked-down portion 58 of the inflator are adjacent one or more gas ports 60 formed within the tubular frame part 40a. The inflator 50 may be installed in the frame part 40a through a hollow end 44 (see FIG. 1) or through a cutout or window 46 (shown in phantom line) in the frame part 40a located above or below the desired mounting location of the inflator 50. This type of installation minimizes the number of parts and weight of the module. After the inflator 50 is installed within the frame part 40a, a manifold/cushion pack 70 is attached (to the frame part 40a). The pack 70 includes a housing 72 having a base 74 that includes an open bottom 76 shaped so that it conforms to the shape of the tubular frame part 40a. These frame parts 40a are typically of circular, cylindrical or box-like construction (having a flat mounting surface). Secured to the housing 72 is a manifold 80 comprising a plurality of flow openings 82. After the inflation gas exits the gas ports 60 it enters the chamber 84 bounded by the manifold 80 and the frame part 40a. The inflation gas is then distributed throughout the chamber 84 and exits the flow openings 82 generally uniformly into the housing 72. Situated within the housing 72 is an air bag 90 having a neck portion 92 secured to the housing or sandwiched between the manifold 80 and the housing walls 76. As is known in the art, prior to activation of the inflator 50, the air bag 90 is maintained in a folded configuration and is then inflated upon receipt of the inflation gas. The housing 72 may be hollow, in which case its walls 76 define a opening or channel 98 through which the air bag 90 expands. Alternately as illustrated, the housing 72 may include a cover portion 94 having a tear seam 96. In this embodiment the folded air bag is fully protected from tampering. As the air bag inflates it bears upon the cover 94 causing the tear seam 96 to open, permitting the air bag to inflate through the then defined opening/channel 98 (shown in phantom line).

The housing 72 may be mounted to the tubular frame part 40a in a number of ways. As illustrated in FIG. 2 the housing includes a clamping part 100 positioned opposite the frame part 40a. Mounting fasteners 110 extend through holes 112 in the clamp 100 and through holes 114 in the frame part 40a and may be received in threaded holes 116 in the housing 72. If additional support is need to retain the inflator within the frame part 40a, the inflator may be fabricated with a through passage 118. One or more of the fasteners such as 110 can pass through the inflator 90. Alternately, one of the fasteners can provide a lower position stop for the inflator, locating it properly relative to the mounting holes 114.

Figure 3:
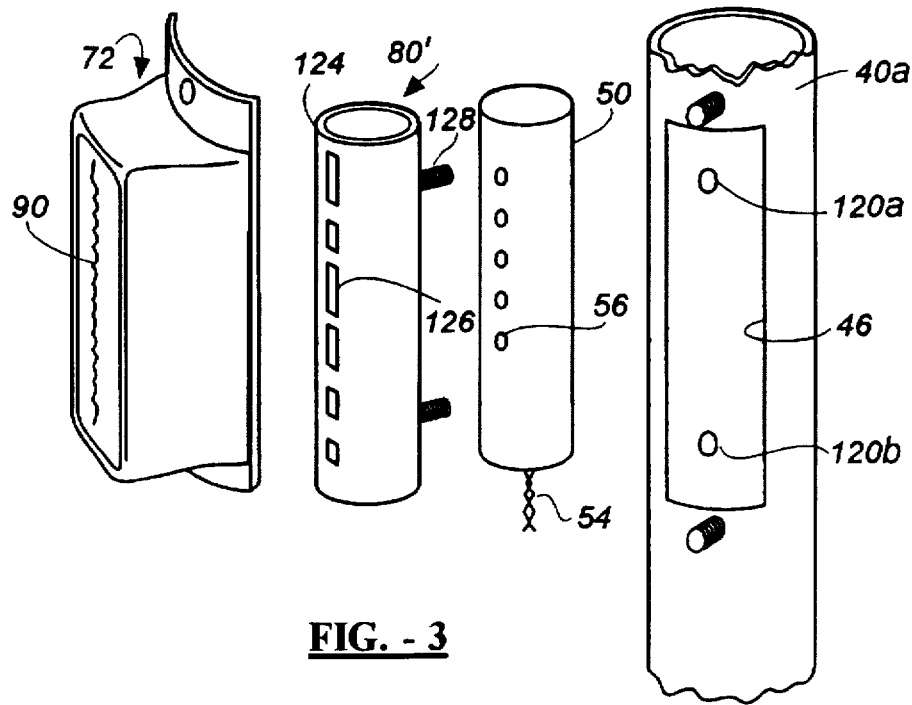
FIGS. 3 and 4 illustrate an alternate embodiment of the invention.
Figure 4:
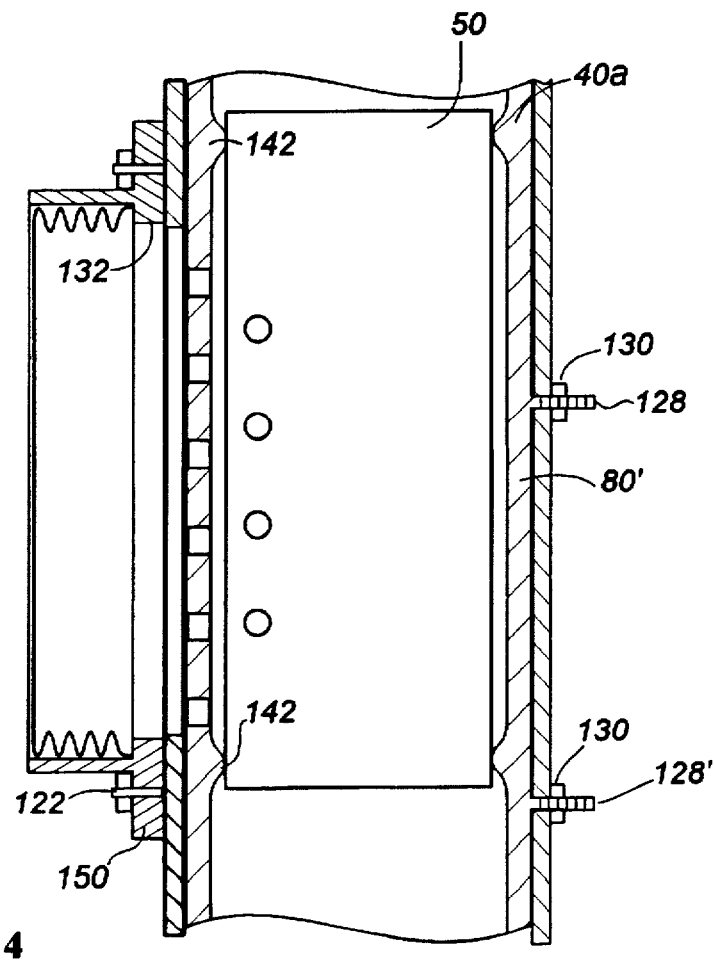

Reference is made to FIGS. 3 and 4 which show another embodiment of the invention. In this embodiment the tubular frame part 40a includes a cutout 46 proximate the mounting location of the inflator and two mounting studs 122 proximate the cutout 46. The frame part 40a also includes two openings 120 opposite the cutout 46 to receive mounting studs of the manifold 80'. In this embodiment a cylindrically shaped manifold 80'is used and includes a hollow body 124, a plurality of flow ports 12 and two mounting studs 128 extending from the body 124 which are received within respective openings 120a,b and secured by a nut 130. The inflator 50 is secured within the hollow manifold 80'. Depressions (or swaged ends) 142 of the manifold provide for a pressed fit connection with the inflator 50. The inflator 50 is inserted within the manifold 80' and the manifold 80' is inserted within the opening 46 in the frame part 40a and secured thereto with nuts 130. The hollow housing 72, with an air bag 90 attached thereto, is secured to the frame part 40a enclosing the opening 46. The housing 72 provides a conduit 132 or channel directing the inflation gas from the inflator into the air bag 90. The housing 72 is appropriately secured with nuts 150 received on studs 122.

Figure 5:
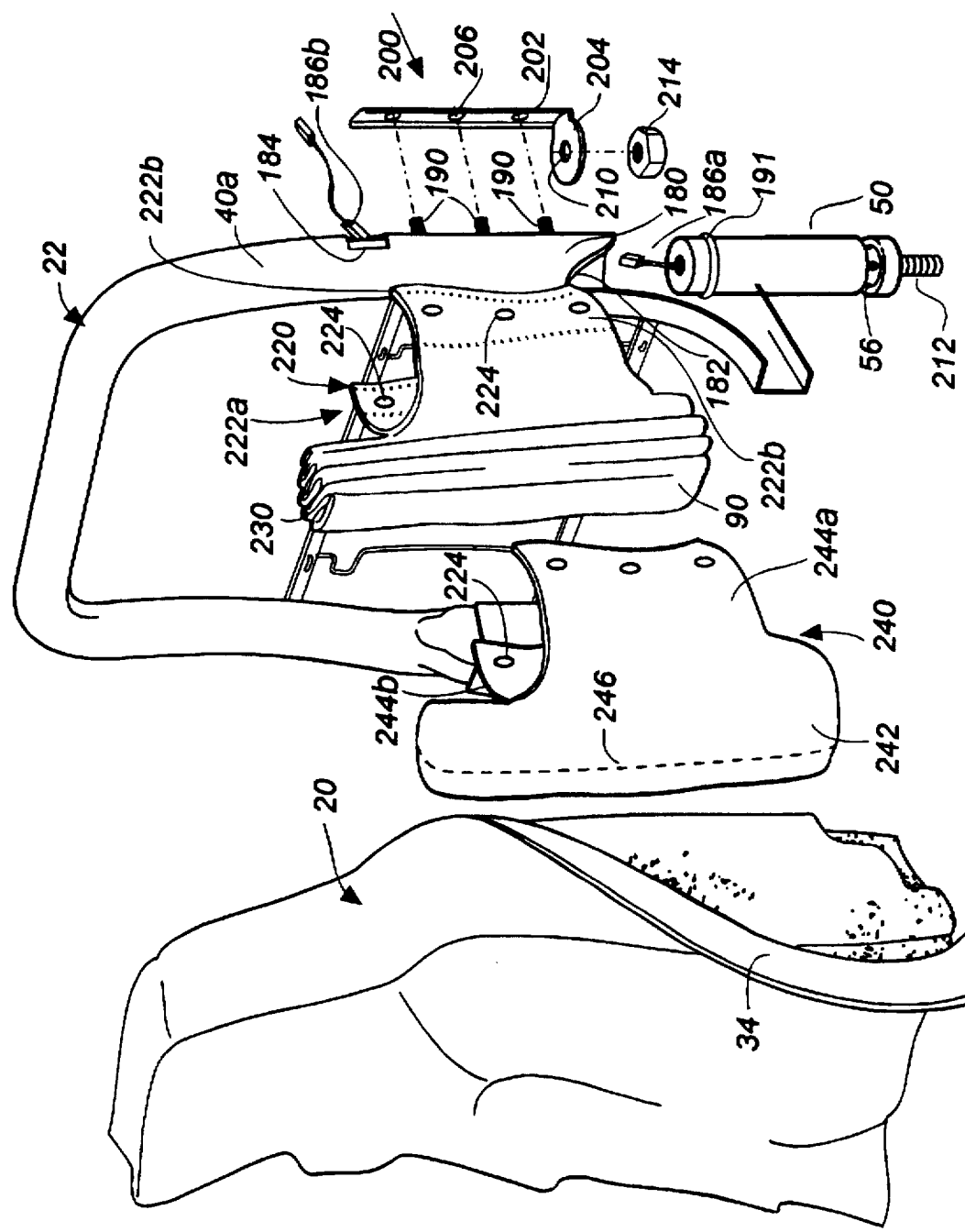
FIGS. 5 and 6 show another embodiment of the invention.
Figure 6:
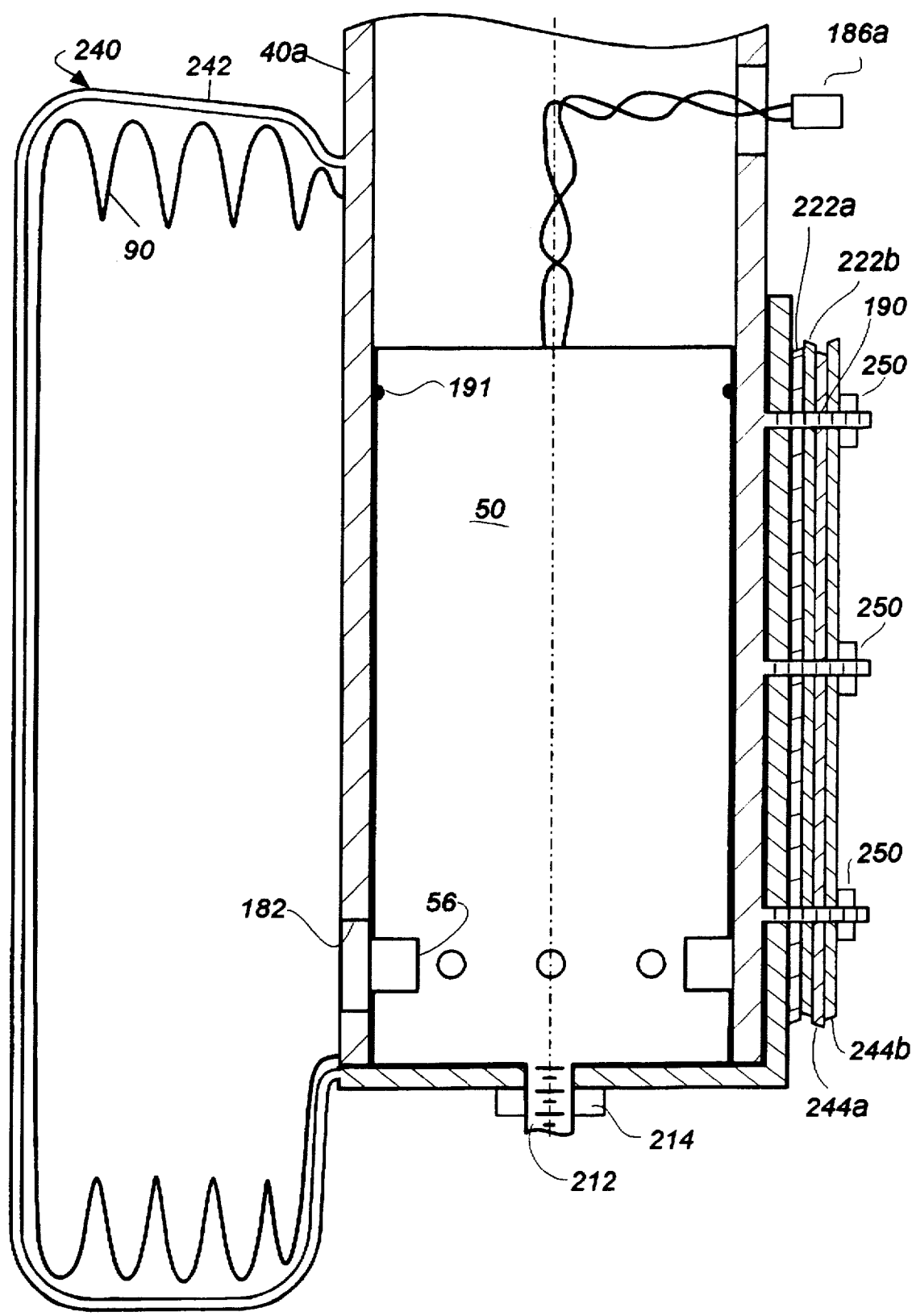

Reference is made to the embodiment of the invention shown in FIGS. 5 and 6. As in FIG. 1 the frame part 40a functions as the manifold for the inflator 50. In this embodiment the open end 180 of the frame part 40a includes a notch, cutout or exit port (or ports) 182 through which inflation gas flows into the air bag 90. The frame part 40a also includes an opening to enable the connector 186a to be attached to another connector 186b which is connected to a control unit. The frame part 40a further includes a number of mounting studs 190. The inflator 50 is forced into the open end 180 of the frame part 40a. The inflator 50 includes a seal 191 such as an O-ring, to provide a fluid seal between the top of the inflator and inside wall of the frame part 40a. With the inflator 50a in place inside the tubular frame part 40a an L-shaped bracket 200 having an axial portion 202 and a lateral retaining portion 204 is attached to the mounting studs 190. As can be seen the axial part 202 of the bracket includes a number of mounting holes 206 which are received about a like mounting stud 190. With the bracket 200 in place against the frame part 40a, the hole 210 in the lateral part 204 is positioned to receive the threaded stud 212 on the inflator 50. A nut 216 secures the inflator to the bracket. When so secured the exit ports 56 of the inflator 50 lie proximate the opening or exit port 182 formed in the frame part 40a. The diameter of the lateral part 204 encloses the flat end 180 of the frame part 40a sealing same to prevent inflation gas from leaking therefrom. An additional seal such as an O-ring can be added to provide added sealing. The air bag 90 having neck portion 220 comprising flaps 222a,b is mounted upon the frame part 40a and the flaps wrapped about the extending studs 190. The studs 190 extend through openings 224 in each flap 222a,b. When in position on the studs 10 the flaps overlap one another. Positioned adjacent the neck portion 220 of the air bag 90 is a cushion portion 230 which is folded into a compact configuration. The folded bag is protected by a fabric cover 240 comprising a large section 242 which covers the folded air bag 90 and a plurality of flaps 244a,b which are mounted to the studs 190 in an overlapping arrangement and secured by nuts 250. The bag 90 can be folded after the flaps are attached to the frame 40a or folded prior to attachment, in which case the cover is placed about the air bag to prevent it from unfurling. The cover 240 includes a tear seam 246 which opens as the air bag 90 is inflated. As the air bag 90 inflates the seat back is ripped open permitting the air bag to continue to inflate. Upon inflation the air bag will be positioned between the side of the occupant and the side of the vehicle.

Many changes and modifications in the above described embodiment of the invention can, of course, be carried out without departing from the scope thereof. Accordingly, that scope is intended to be limited only by the scope of the appended claims.

We claim:

1. An assembly comprising:

a seat (20) having a hollow tubular frame part (40a) with an open end (180) having a gas flow port (182); and an air bag module (36) comprising an inflator (50), the inflator including at least one exit port (56); wherein the inflator (50) is fitted within the hollow frame part (40a) with the exit port (56) in fluid communication with the flow port (182), an L-shaped bracket, having an axial portion (202) fitted against the frame part and a lateral part sealing the open end (180) and an air bag (90) disposed in fluid communication with the flow port (182) and wrapped about the axial portion of the bracket.

2. An assembly comprising:

a seat (20) having a hollow tubular frame part (40a) with an open part (180) and a gas flow port (182);

an air bag module (36) comprising an inflator (50), the inflator including at least one exit port (56); wherein the inflator (50) is fitted within the hollow frame part (40a) with the exit port (56) in fluid communication with the flow port (182), an L-shaped bracket having an axial portion (202) adjacent the frame part and a lateral part sealing the open part (180) and air bag (90) disposed in fluid communication with the flow port (182).

3. The device as defined in claim 2 wherein the air bag is wrapped about the axial portion of the bracket.

4. An assembly comprising:

a seat (20) having a tubular frame part (40a), the frame part including a cylindrical wall defining sides of a cylindrical interior receiving space;

an air bag inflator located within the receiving space in an abutting relationship with the interior of the cylindrical wall, the inflator including at least one inflation gas flow port through which inflation gas flows;

the cylindrical wall, adjacent the receiving space, being closed except for at least one gas exit port formed integrally though the cylindrical wall and located generally adjacent the at least one gas flow port;

sealing means for sealing opposing ends of the inflator to the interior of the cylindrical wall for preventing inflation gas from flowing out of the receiving space.

5. The device as defined in claim 4 wherein the inflator includes a narrowed portion with the at least one inflation gas flow port (60) at the narrowed portion;

the narrowed portion of the inflator and the interior of the cylindrical wall defining a distribution chamber; and wherein the exit port is in direct communication with the distribution chamber.

6. The device as defined in claim 4 including a manifold (80) secured to the exterior of the frame part, covering the at least one gas exit port (60) and extending away from the gas exit port along the exterior of the cylindrical wall, the manifold including a plurality of gas distribution ports (82), spaced from the cylindrical wall, to transform the stream of inflation gas exiting the gas exit port into a plurality of streams exiting the distribution ports;

an air bag module (36) including an air bag (90) and a protective housing (72) for the air bag, the housing mounted to the frame part about the manifold and the air bag situated to receive inflation gas exiting the distribution ports.

7. The device as defined in claim 6 including clamping means for securing a lower portion of the housing to the frame part.

8. The device as defined in claim 7 wherein the cylindrical wall adjacent an upper end of the inflator includes opposed mounting openings, and wherein the inflator includes a through passage aligned to the opposed mounting openings and wherein a fastener (110) extends through the passage and the mounting openings to secure the upper end of the inflator to the cylindrical wall.

* * * * *